Dec. 31, 1929.   C. E. ANDERSON   1,742,052
RETAINER FOR NUTS
Filed March 11, 1925

INVENTOR
CARL ERIC ANDERSON
BY
ATTORNEYS

Patented Dec. 31, 1929

1,742,052

UNITED STATES PATENT OFFICE

CARL ERIC ANDERSON, OF STRATFORD, CONNECTICUT, ASSIGNOR TO THE BRYANT ELECTRIC COMPANY, OF BRIDGEPORT, CONNECTICUT, A CORPORATION OF CONNECTICUT

RETAINER FOR NUTS

Application filed March 11, 1925. Serial No. 14,831.

My invention relates to a retainer for bolt nuts, and the object of my invention is to provide a simple and inexpensive device for retaining nuts in their seats to prevent loss or misplacement thereof.

In the accompanying drawings—

While the present device is useful in many different relations, it is of particular value for holding in their seats small nuts which are apt to be misplaced or lost. Such screw bolts and nuts are used to a large extent in the electrical industry for uniting insulating buttons or blocks, or for mounting electrical conductors thereon. Even in this specific field the utility of the invention is wide and diverse. It will be understood therefore that the particular fitting shown is but a single illustrative use to which the invention may be put.

Figure 1:
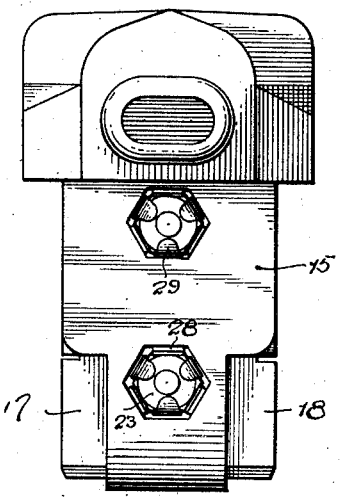
Fig. 1 is a side elevation of an electrical fitting illustrating a use of my appliance.
Figure 2:
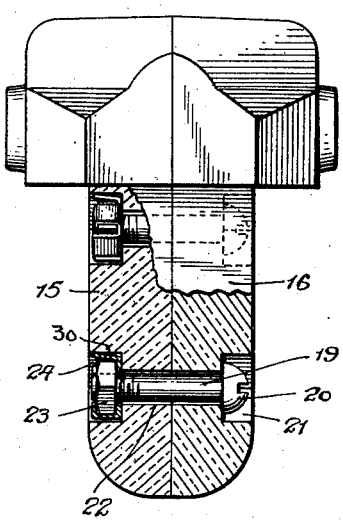
Fig. 2 is a broken elevation at right angles to Fig. 1.

The fitting shown in Figs. 1 and 2 is an attachment plug the body of which comprises two blocks of insulation 15 and 16, between which are housed wire terminals (not shown) connected to the contacts 17 and 18. In order to obtain access to the terminals for wiring, the blocks 15 and 16 must be separated, and for this reason the means for securing the blocks together must be of appropriate character for this purpose. The common practice is to unite the blocks by means of a screw bolt 19, the head 20 of which is seated in a recess 21 in one block (16), the shank of the bolt passing through registering holes 22 in both blocks and taking into a nut 23 resting in the seat 24 in the other block (17). When the screw bolt is removed the nut 23 is very apt to drop out of its seat 24 and become lost or misplaced. This has resulted in the use of tapped rivets molded into the block 15 when the latter is of such material that this operation is possible. It is not possible, however, when the block 15 is of porcelain, and in such cases it has been common practice to hold the nut in position by wax. This practice is not satisfactory since the wax breaks out; furthermore the wax detracts from the appearance of the device.

To meet the difficulty I provide the nut 23 with a spring retainer which is fitted upon the nut, slipped into recess 24 with the latter, and thereafter holds the nut in the recess against accidental escape.

Figure 3:
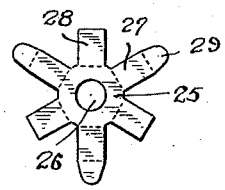
Fig. 3 is a plan of one form of sheet metal blank from which a nut retainer may be formed.
Figure 4:
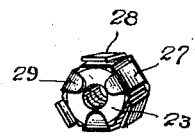
Fig. 4 is a perspective of a nut showing a retainer applied thereto.

This nut retainer is preferably made from sheet metal, and for a hex nut such as that shown, preferably comprises a blank illustrated in Fig. 3. The body 25 of the blank, which lies against one face of the nut, is centrally pierced at 26 to permit the shank of the bolt 19 to pass therethrough into the nut. From the margin of the body 25 extends six radial fingers, three of which, 27, form securing fingers and alternate with three others, 28, which form spring retainers. The fingers 27 are offset from the base 25 to embrace alternate facets of the nut, while their tips 29 are bent inward to overlie the outer face of the nut, thus centering and securing the retainer on the nut. The fingers 28 are offset from the base 25 of the retainer, and are angled slightly away from the sides of the nut.

The metal of the retainer has such inherent resiliency that when the nut is pressed into the recess forming the seat 24, the spring fingers 28 which engage the side walls 30 of the recess (Fig. 2) with spring friction, hold the nut against escape. In fact if the nut is inserted with the base 25 of the retainer adjacent the bottom of the recess, the sharp edges of the ends of spring arms 28 dig into the side walls of the recess or engage any roughness thereon and form positive stops. In any event, they afford a strong frictional grip upon the recess walls, which is amply sufficient to function as a retainer against any accidental displacement. Nevertheless the nut may be positively pushed out by a straight thrust with the bolt, if for any reason it is desirable to replace the nut—for instance if its threads have been stripped.

The nut illustrated is a hex nut, and the recess 24 in which the nut is seated is correspondingly shaped to hold it against rotation while the bolt 19 is being screwed up. Of course a nut of any appropriate shape may be used, the retainer being appropriately varied in construction to meet the shape of the nut.

A nut provided with a retainer of this type may be used with either a porcelain or composition block for an electrical fitting. When the blocks 15 and 16 may be of like shape, as shown, a single die will serve for both blocks, since there is no necessity for a molded-in part in either. The resulting economy is considerable. No waxing is necessary, and this objectionable practice is eliminated, as well as the expense incident thereto. Standard nuts may be used, while the retainer is easily blanked and formed to shape.

With the understanding that my invention may be embodied in various modifications of the retainer itself, and that its utility is not by any means limited to the field of electrical fittings, I claim as my invention—

1. For use with a nut, a retainer comprising a base adapted to lie against the face of the nut and apertured in register with the opening thereof, gripping fingers integral with the base adapted to be bent into engagement with the nut to hold the retainer thereon, and retaining fingers extending from the base to engage the wall of a recess in which the nut is seated to hold the nut against escape from the recess.

2. For use with a nut, a retainer comprising a base adapted to lie against the face of the nut and apertured to register with the opening in said nut, said retainer having means for securing it to the nut and resilient fingers of a length approximately equal to the thickness of the nut and adapted to engage the wall of a recessed seat to hold the nut against escape therefrom.

3. For use with a nut in a recess, a retainer made of a unitary piece comprising a member for engaging the nut to restrain the nut and retainer both from separation and from relative rotation and comprising also a separate resilient member for securing the retainer and nut in the recess by reason of its resilient engagement with the wall of said recess.

In testimony whereof I have signed my name to this specification.

CARL ERIC ANDERSON.